United States Patent
Lutnaes

(10) Patent No.: US 7,865,739 B2
(45) Date of Patent: Jan. 4, 2011

(54) METHODS AND DEVICES FOR TRANSFERRING SECURITY DATA BETWEEN MEMORIES

(75) Inventor: Sturla Lutnaes, Uppsala (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1154 days.

(21) Appl. No.: 10/569,530

(22) PCT Filed: Aug. 25, 2004

(86) PCT No.: PCT/EP2004/009462

§ 371 (c)(1),
(2), (4) Date: Feb. 24, 2006

(87) PCT Pub. No.: WO2005/022366

PCT Pub. Date: Mar. 10, 2005

(65) Prior Publication Data

US 2006/0218411 A1    Sep. 28, 2006

Related U.S. Application Data

(60) Provisional application No. 60/501,630, filed on Sep. 9, 2003.

(30) Foreign Application Priority Data

Sep. 2, 2003    (EP) ................... 03019882

(51) Int. Cl.
*G06F 12/14* (2006.01)
(52) U.S. Cl. ........................ 713/193; 726/33
(58) Field of Classification Search ............... 713/193, 713/189, 194; 726/1–36; 711/365, 152, 711/163, 164, 169
See application file for complete search history.

(56) References Cited

U.S. PATENT DOCUMENTS 4,489,380 A * 12/1984 Carey et al. ................. 711/152

(Continued)

FOREIGN PATENT DOCUMENTS

JP    1-261760    10/1989

(Continued)

OTHER PUBLICATIONS

Yokote et al , 1995, Depertment of computer science, Keio Univerity , pa. 385-398, "SCONE: Using Concurrent Objects for Low Level Operating System Programming" OOPSLA, 95 Austin, Tx, USA@ACM.*

(Continued)

*Primary Examiner*—Matthew B Smithers
*Assistant Examiner*—Abu Sholeman
(74) *Attorney, Agent, or Firm*—Myers Bigel Sibley & Sajovec

(57) ABSTRACT

Methods and devices for transferring data from a non-volatile memory to a working memory of an electronic data processing device are provided. Security data is copied from the non-volatile memory to the working memory. The security data is to be write-protected. A blocking function is activated for the security data in the working memory. The activation is triggered by the copying being made to the working memory. All communication with the working memory is monitored. All write attempts to the copied security data stored in the working memory are blocked according to the blocking function. At least activating a blocking function, monitoring communication and blocking write attempts are performed independently of a central processing unit of the electronic data processing device, such that the central processing unit cannot manipulate the security data.

27 Claims, 2 Drawing Sheets

U.S. PATENT DOCUMENTS

| | | | |
|---|---|---|---|
| 4,489,880 A * | 12/1984 | Calvert | 206/434 |
| 4,574,350 A * | 3/1986 | Starr | 710/200 |
| 5,166,903 A * | 11/1992 | Aichelmann, Jr. | 365/189.03 |
| 5,249,285 A * | 9/1993 | Mueller et al. | 711/161 |
| 5,491,827 A | 2/1996 | Holtey | |
| 5,537,544 A * | 7/1996 | Morisawa et al. | 726/19 |
| 5,561,817 A | 10/1996 | McCormack et al. | |
| 5,586,291 A * | 12/1996 | Lasker et al. | 711/113 |
| 5,590,641 A * | 1/1997 | Duong | 126/85 B |
| 5,632,026 A * | 5/1997 | Chuang | 711/163 |
| 5,634,099 A | 5/1997 | Andrews et al. | |
| 5,825,875 A * | 10/1998 | Ugon | 705/65 |
| 5,825,878 A | 10/1998 | Takahashi et al. | |
| 5,850,559 A * | 12/1998 | Angelo et al. | 713/320 |
| 5,887,131 A * | 3/1999 | Angelo | 726/20 |
| 5,944,821 A * | 8/1999 | Angelo | 726/22 |
| 5,953,422 A * | 9/1999 | Angelo et al. | 713/185 |
| 5,964,877 A * | 10/1999 | Victor et al. | 726/18 |
| 5,973,968 A * | 10/1999 | Schu et al. | 365/195 |
| 5,974,500 A * | 10/1999 | Maletsky et al. | 711/103 |
| 6,078,520 A * | 6/2000 | Tobita et al. | 365/185.09 |
| 6,115,819 A * | 9/2000 | Anderson | 726/20 |
| 6,128,732 A * | 10/2000 | Chaiken | 713/2 |
| 6,178,550 B1* | 1/2001 | Pearce | 717/100 |
| 6,223,284 B1* | 4/2001 | Novoa et al. | 713/100 |
| 6,336,185 B1* | 1/2002 | Sargenti et al. | 713/2 |
| 6,510,501 B1* | 1/2003 | Ho | 711/163 |
| 2003/0023822 A1* | 1/2003 | Scott et al. | 711/163 |
| 2003/0135706 A1* | 7/2003 | Lin et al. | 711/163 |
| 2003/0140238 A1* | 7/2003 | Turkboylari | 713/193 |
| 2003/0226029 A1* | 12/2003 | Porter et al. | 713/200 |
| 2004/0255141 A1* | 12/2004 | Hodder et al. | 713/200 |

FOREIGN PATENT DOCUMENTS

JP    2000-20401    1/2000

OTHER PUBLICATIONS

International Search Report corresponding to PCT/EP2004/009462, mailed Jan. 25, 2005.
International Preliminary Report on Patentability corresponding to PCT/EP2004/009462, mailed Sep. 29, 2005.

* cited by examiner

METHODS AND DEVICES FOR TRANSFERRING SECURITY DATA BETWEEN MEMORIES

RELATED APPLICATIONS

The present application is a 35 U.S.C. §371 national phase application of PCT International Application No. PCT/EP2004/009462, having an international filing date of Aug. 25, 2004, and claiming priority to European Patent Application No. 03019882.4, filed Sep. 2, 2003 and U.S. Provisional Application Ser. No. 60/501,630, filed Sep. 9, 2003, the disclosures of which are incorporated herein by reference in their entireties. The above PCT International Application was published in the English language and has International Publication No. WO 2005/022366.

TECHNICAL FIELD OF THE INVENTION

The present invention relates to the field of safe transfer of security data from one memory to another in an electronic data processing environment. In particular the present invention relates to a method of transferring data from a non-volatile memory to a working memory of an electronic data processing device, such an electronic data processing device as well as to a device for blocking write attempts.

BACKGROUND OF THE INVENTION

The cellular phones of today have more and more different functions and applications in them. One such function is the possibility to make economical transactions. In performing transactions there is normally used security data in the form of private encryption keys. The storage of these keys has to be safe and safeguarded from manipulation.

In relation to cellular phones these keys have up till now been stored in so-called NOR flash memories. These known memories are of the type XIP (execute in place), which means that the keys are not moved from the memory. It is today possible to block writing of the position of such keys on such a memory using hardware solutions. Such solutions monitor program execution and data access on the system bus inside the phone. Software code that is not part of the authenticated firmware of the device is prevented from accessing the keys. These solutions assume that at least the firmware and possibly the keys are located in an XIP memory, so that address patterns on the bus are fixed for any given execution sequence.

Such NOR flash memories are however relatively expensive, why there is a trend to replace them with so-called NAND flash memories, which are cheaper. These memories are however not of the XIP type, and in order to use the content stored on them, the content has to be moved or copied to a working memory of the phone.

There is therefore a need for being able to protect such security data from manipulation when it is being moved from the NAND flash memory to the working memory.

It is furthermore often desirable to provide such a protection independently of the central processing of the unit, since otherwise other units such as a debugging unit, which is often a part of the phone for development reasons, can influence such security information.

SUMMARY OF THE INVENTION

The present invention is thus directed towards solving the problem of protecting the security data from manipulation, when it is moved from a non-volatile memory to a working memory as well as after such relocation.

This is achieved by copying data from the non-volatile memory to the working memory, which data includes security data to be write-protected, activating blocking of the security data in the working memory, monitoring all communication with the working memory, and blocking all write attempts to the copied security data stored in the working memory, where activating blocking, monitoring communication and blocking write attempts are performed independently of the central processing unit of the data processing device, such that the central processing unit cannot manipulate the security data.

One object of the present invention is to provide a method that protects security data from manipulation when the data is moved from a non-volatile memory to a working memory as well as after such relocation.

According to a first aspect of the present invention, the object is achieved by a method of transferring data from a non-volatile memory to a working memory of an electronic data processing device, comprising the steps of:

copying data from the non-volatile memory to the working memory, which data includes security data to be write-protected, activating a blocking of the security data in the working memory, monitoring all communication with the working memory, and blocking all write attempts to the copied security data stored in the working memory, wherein at least the steps of activating a blocking, monitoring communication and blocking write attempts are performed independently of the central processing unit of the data processing device, such that the central processing unit cannot manipulate the security data.

A second aspect of the present invention is directed to a method including the features of the first aspect, wherein the area of the security data in the non-volatile memory is pre-defined and pre-stored in a device for blocking write attempts and used at least in relation to activating a blocking.

A third aspect of the present invention is directed towards a method including the features of the first aspect, wherein the step of copying data comprises copying only the security data from the non-volatile memory to the working memory independently of the central processing unit of the data processing device and copying any further data under the control of the central processing unit of the device.

A fourth aspect of the present invention is directed towards a method including the features of the third aspect, wherein the area of the security data in the non-volatile memory and the area for storage of the security data in the working memory are pre-defined and wherein the step of activating a blocking of positions of the working memory is triggered by the copying being made to the pre-defined area in the working memory and the blocking is activated for said area.

A fifth aspect of the present invention is directed towards a method including the features of the first aspect, wherein the step of copying comprises copying all data from the non-volatile memory to the working memory under the control of the central processing unit of the device.

A sixth aspect of the present invention is directed towards a method including the features of the fifth aspect, wherein the area of the security data in the non-volatile memory is pre-defined and wherein the step of activating a blocking is triggered by a first detection of copying of security data from the pre-defined area in the non-volatile memory to an area of the working memory and the blocking is activated for that area of the working memory.

A seventh aspect of the present invention is directed towards a method including the features of the first aspect, wherein the step of blocking is achieved by changing the destination address of the data transferred to the working memory.

An eighth aspect of the present invention is directed towards a method including the features of the first aspect, further comprising the steps of disconnecting a debugging unit at least when copying the security data to the working memory and reconnecting the debugging unit when the blocking has been activated.

Another object of the present invention is to provide a device for blocking write attempts to security data that protects security data from manipulation when the data is moved from a non-volatile memory to a working memory as well as after such relocation.

According to a ninth aspect of the present invention, this object is achieved by a device for blocking write attempts to security data transferred from a non-volatile memory to a working memory in an electronic data processing environment that includes a central processing unit and comprising:
a monitoring unit arranged to:
activate a blocking of the security data in the working memory upon copying of the security data from the non-volatile memory to the working memory,
monitor all communication with the working memory, and
block all write attempts to the copied security data stored in the working memory,
all performed independently of the central processing unit of the data processing environment, such that the central processing unit cannot manipulate the security data.

A tenth aspect of the present invention is directed towards a method including the features of the ninth aspect, wherein the area of the security data in the non-volatile memory is pre-defined and pre-stored in the device and used in relation at least to activating a blocking.

An eleventh aspect of the present invention is directed towards a device including the features of the ninth aspect, further comprising a copy control unit arranged to copy the security data from the non-volatile memory to the working memory also independently of the central processing unit of the data processing environment.

A twelfth aspect of the present invention is directed towards a device including the features of the eleventh aspect, where the area of the security data in the non-volatile memory and the area for storage of the security data in the working memory are pre-defined and pre-stored in the device and the monitoring unit when activating a blocking is triggered by the copying being made to the pre-defined area in the working memory and activates a blocking of that area.

A thirteenth aspect of the present invention is directed towards a device including the features of the ninth aspect, where the area of the security data in the non-volatile memory is pre-defined and pre-stored in the device and the monitoring unit when activating a blocking is triggered by a first detection of copying of security data from the pre-defined area in the non-volatile memory to an area of the working memory and activating a blocking for that area of the working memory.

A fourteenth aspect of the present invention is directed towards a device including the features of the ninth aspect, wherein the monitoring unit is arranged to block write attempts by changing the destination address of data transferred to the working memory.

A fifteenth aspect of the present invention is directed towards a device including the features of the ninth aspect, wherein the monitoring unit is arranged to disconnect a debugging unit of the electronic data processing environment at least when the security data is copied to the working memory and to reconnect the debugging unit when the blocking has been activated.

A sixteenth aspect of the present invention is directed towards a device including the features of the ninth aspect, wherein it is implemented in hardware.

Yet another object is to provide an electronic data processing device that protects security data from manipulation when the data is moved from a non-volatile memory to a working memory as well as after such relocation.

According to a seventeenth aspect of the present invention, this object is achieved by an electronic data processing device comprising:
a non-volatile memory comprising data including security data to be write-protected,
a working memory,
a central processing unit arranged to control copying of at least some data from the non-volatile memory to the working memory, and
a device for blocking write attempts to security data transferred from the non-volatile memory to the working memory and comprising a monitoring unit arranged to:
activate a blocking of the security data in the working memory upon copying of the security data from the non-volatile memory to the working memory,
monitor all communication with the working memory, and
block all write attempts to the copied security data stored in the working memory,
all performed independently of the central processing unit, such that the central processing unit cannot manipulate the security data.

An eighteenth aspect of the present invention is directed towards a device including the features of the seventeenth aspect, wherein the area of the security data in the non-volatile memory is pre-defined and pre-stored in the device for blocking write attempts and used in relation at least to activating a blocking.

A nineteenth aspect of the present invention is directed towards a device including the features of the seventeenth aspect, wherein the device for blocking write attempts further comprises a copy control unit arranged to copy the security data from the non-volatile memory to the working memory independently of the central processing unit and the central processing unit is arranged to control the copying of further data from the non-volatile memory to the working memory.

A twentieth aspect of the present invention is directed towards a device including the features of the nineteenth aspect, where the area of the security data in the non-volatile memory and the area for storage of the security data in the working memory are pre-defined and pre-stored in the device for blocking write attempts and the monitoring unit when activating a blocking is triggered by the copying being made to the pre-defined area in the working memory and activates a blocking of that area.

A twenty-first aspect of the present invention is directed towards a device including the features of the seventeenth aspect, wherein the central processing unit is arranged to control the copying of all data from the non-volatile memory to the working memory.

A twenty-second aspect of the present invention is directed towards a device including the features of the twenty-first aspect, where the area of the security data in the non-volatile memory is pre-defined and pre-stored in the device for blocking write attempts and the monitoring unit when activating a blocking is triggered by a first detection of copying of security data from the pre-defined area in the non-volatile memory to an area of the working memory and activating a blocking for that area of the working memory.

A twenty-third aspect of the present invention is directed towards a device including the features of the seventeenth aspect, wherein the monitoring unit is arranged to block write attempts by changing the destination address of data transferred to the working memory.

A twenty-fourth aspect of the present invention is directed towards a device including the features of the seventeenth aspect, further comprising a debugging unit and wherein the monitoring unit is arranged to disconnect the debugging unit at least when the security data is copied to the working memory and to reconnect the debugging unit when the blocking has been activated.

A twenty-fifth aspect of the present invention is directed towards a device including the features of the seventeenth aspect, wherein the device for blocking write attempts is implemented in hardware.

A twenty-sixth aspect of the present invention is directed towards a device including the features of the seventeenth aspect, wherein the device is a portable communication device.

A twenty-seventh aspect of the present invention is directed towards a device including the features of the twenty-sixth aspect, wherein the device is a cellular phone.

The invention has the following advantages. It enables the storage of security data in a working memory without risking tampering of this data, which is guaranteed by the independence from the central processing unit. Another advantage is that cheaper memories therefore can be used instead of the memories that would otherwise be needed. It also allows the possibility to keep a debugging unit in the electronic data processing device for debugging software loaded in the device without having to compromise the safety of the security data.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figure 1:
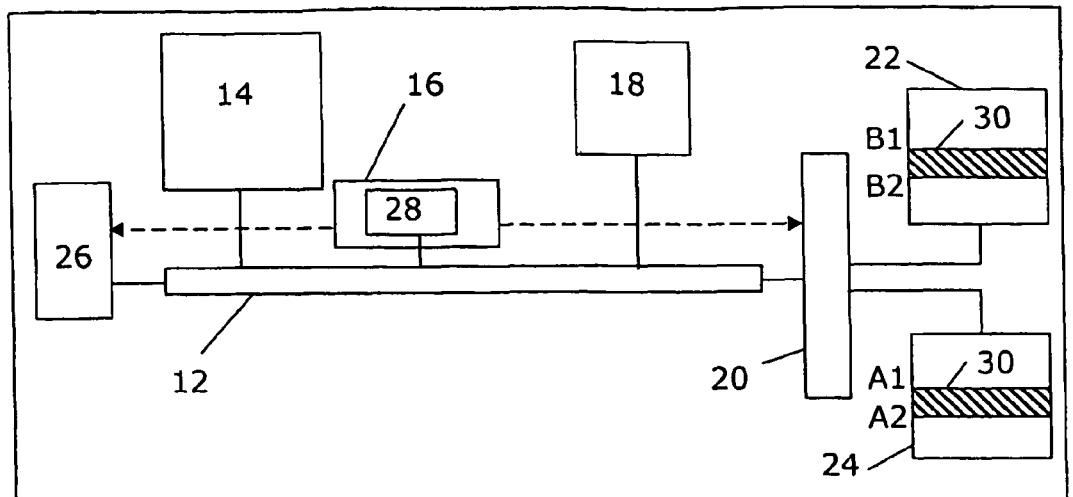
FIG. 1 shows a block schematic of an electronic processing device including a device for blocking write attempts both according to a first embodiment of the invention.

An electronic data processing device 10 according to a first embodiment of the invention is shown in a block schematic in FIG. 1. The device is preferably provided in a portable communication device and in the preferred embodiment the device is provided in a cellular phone and then a so-called smartphone. A cellular phone is just one example of where the invention can be implemented. The invention can for instance also be used in a PDA (personal digital assistant), a palm top computer, a lap top computer and in a PC (personal Computer). The device where the electronic data processing device according to the invention is implemented should however have functionality for secure transferring and transactions.

The device 10 includes a communication bus 12 to which are connected a central processing unit 14, a device for blocking write attempts 16, a ROM memory 18 and an interface 20 towards external memories. The device 16 includes a monitoring unit 28, the functioning of which will be described in more detail layer. To the interface 20 are connected a working memory 22, which preferably is a volatile so-called SD RAM memory and a non-volatile NAND flash memory 24. A debugging unit 26 is also connected to the bus 12. The NAND flash memory includes an area defined by memory addresses A1 and A2, which area comprises security data 30 in the form of private cryptographic keys. The working memory 22 includes a corresponding area defined by memory addresses B1 and B2, which is to receive the private security keys.

The main functioning of the electronic data processing device is, as is well known to the man skilled in the art, to execute software stored in different memories under the control of the central processing unit. Some such software can be some type of transactions software originally stored in the NAND flash memory. The information on a NAND flash memory cannot be used directly, but this information has to be transferred to a working memory before being used. If this is done in a straight-forward way, without taking necessary precautions, this data can be tampered with, which is highly undesirable if the data includes private keys to be used in for instance transactions involving money. One such source of tampering can be the debugging unit, which is connected to the device in order to debug faulty programs. This debugging unit often has contact with other devices, like computers and servers and can take control of the central processing unit of the electronic processing device and is therefore a potential safety risk for the data that is transferred.

Figure 2:
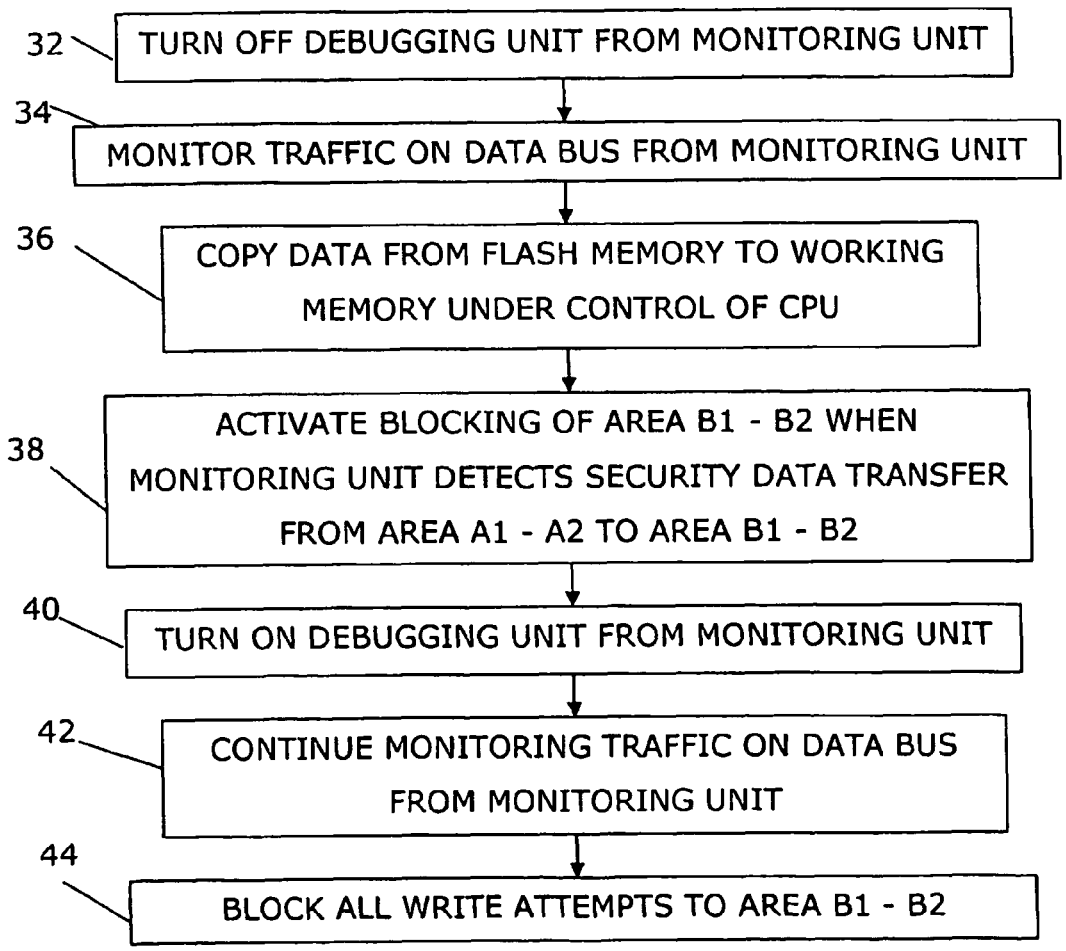
FIG. 2 shows a flow chart of a method according to the first embodiment of the invention.

The device and method according to a first embodiment of the invention takes care of some of these safety aspects. Therefore the performance of the device according to this first embodiment will now be explained with reference being made to FIG. 2, which shows a flow chart of a method according to this first embodiment of the invention.

At start-up of the device 10 the data in the flash memory 24 has to be transferred to the working memory 22, which in this first embodiment is done under the control of the central processing unit 14. Before this is done, the monitoring unit 28 in device for blocking write attempts 16 disconnects or turns off the debugging unit 26, step 32, in order to safeguard that the security keys in the flash memory 24 will not be tampered with after copying. This turning off is thus done independently from the central processing unit 14. Thereafter the monitoring unit 28 monitors the traffic on the bus 12, step 34. Traffic on the bus is sent using source and destination addresses. As mentioned before the copying of data is performed under the control of the central processing unit 14, step 36. This unit 14 therefore controls the ROM memory 18, which includes transferral codes for transferring all the data in the flash memory 24 to the working memory 22. Here the data from the flash memory 24 can be stored in any position in the working memory 22. The content of the flash memory 24 is transferred sequentially. The monitoring unit 28 is set to look out for the memory addresses A1 and A2 defining the area of the security keys 30 in the flash memory on the data bus 12. This information is pre-set and pre-stored in the monitoring unit 28 and therefore provided beforehand in the monitoring unit 28. When the first of the information is transferred from address A1 to address B1 in the working memory, the monitoring unit begins activating blocking through storing the destination address B1. It then waits until the last address A2 of the area is transferred to destination address B2, which it also stores. The monitoring unit then locks the data area B1-B2 of the working memory 22, since then the keys 30 have been copied. In this way blocking of the address area defined by addresses B1 and B2 was activated by the monitoring unit upon the first detection of data transfer from the area defined by addresses A1 and A2, step 38. The monitoring unit then reconnects or turns on the debugging unit 26, step 40, so that it can function yet again. After this the monitoring unit 28 continues monitoring all the traffic on the bus, step 42, and blocks all attempts to write to the area defined by addresses B1 and B2, step 44. This blocking is normally done through controlling the interface 20 to change address whenever a write command to any address in the area is encountered. Steps 38-44 are all performed by the monitoring unit independently of the central processing unit 14. The device 16 including the monitoring unit 28 is provided in the form of hardware in the form of suitably selected and connected logic circuits. This makes the device 16 work fast. Another advantage is that the functioning of it cannot be changed, which makes illegal tampering of the device hard, so that write-protection of the moved security keys can be guaranteed.

Figure 3:
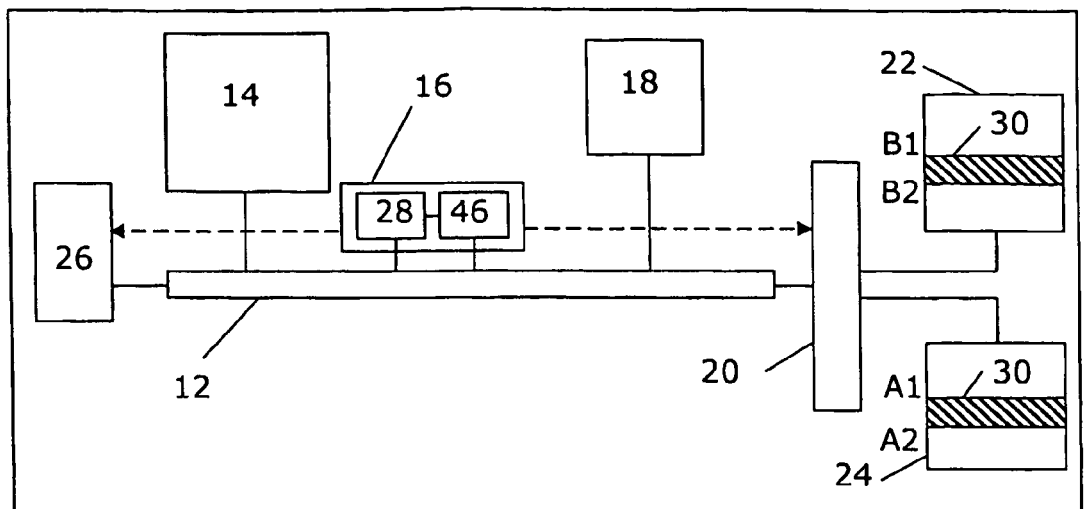
FIG. 3 shows a block schematic of an electronic processing device including a device for blocking write attempts both according to a second embodiment of the invention.
Figure 4:
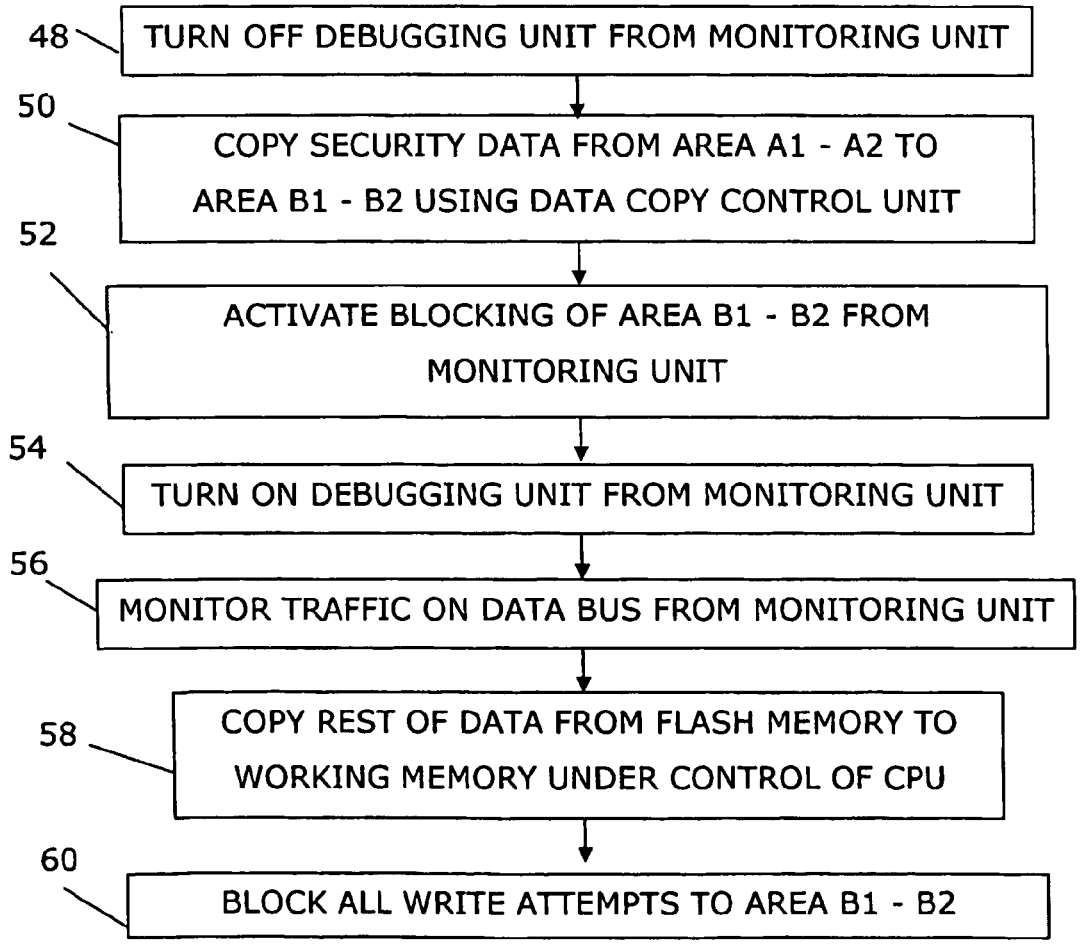
FIG. 4 shows a flow chart of a method according to the second embodiment of the invention.

Now a second embodiment of the invention will be described with reference being made to FIGS. 3 and 4; FIG. 3 shows a device 10 that is similar to the device in FIG. 1. There is only one difference here and that is that the device for blocking write attempts 16 also includes a copy control unit 46. This unit 46, which in this embodiment is a DMA (Direct Memory Access) unit, takes care of the transfer of the keys in the area A1-A2 in the flash memory 24 to the area B1-B2 of the working memory 22. As in the first embodiment, the monitoring unit 28 in device 16 here disconnects or turns off the debugging unit 26, step 48, in order to safeguard that the private security keys 30 in the flash memory 24 will not be tampered with after copying. Thereafter the copy control unit 46 copies the keys 30 in the area defined by addresses A1 and A2 in the flash memory 24 to the area defined by addresses B1 and B2 in the working memory 22, step 50. In this case both the addresses A1-A2 and addresses B1-B2 are pre-defined and pre-stored in the copy control unit 46 and therefore provided beforehand. The copy control unit 46 here also transfer this content sequentially. When the copy control unit 46 has copied these addresses it notifies the monitoring unit 28, which then goes on and activates blocking of the area defined by addresses B1 and B2, step 52. The monitoring unit 28 can also have these addresses B1 and B2 pre-stored or receive them from the copy control unit 46 upon signalling of finished copying. The monitoring unit 28 then reconnects or turns on the debugging unit 26, step 54, so that it can function yet again. Thereafter the monitoring unit 28 starts monitoring all the traffic on the data bus, step 56. The central processing unit 14 transfers the rest of the content from the flash memory 24 to the working memory 22, step 58, which is done in the same way as was described in relation to the first embodiment. The monitoring unit 28 then blocks all attempts to write to the area defined by addresses B1 and B2, step 60. This blocking is done in the same way as was described in the first embodiment. Steps 48-56 and 60 are all performed by the monitoring unit independently of the central processing unit. The device for blocking write attempts 16 including the copy control unit 46 and the monitoring unit 28 is also here provided in the form of hardware for making illegal tampering of the device hard, so that write-protection of the moved security keys can be guaranteed.

When the electronic data processing device is turned off, the working memory is emptied, which means that the data in the flash memory has to be transferred each time the device is turned on again or rebooted.

The present invention has many advantages. It enables the storage of the private security keys in a working memory without risking tampering of these keys, which is guaranteed by the independence of the central processing units. Another advantage is that cheaper memories therefore can be used instead of the memories that would otherwise be needed. It also allows the possibility to keep a debugging unit in the device for debugging software loaded in the device without having to compromise the safety of the security keys.

The present invention can be varied in many ways. The different method steps do not necessarily all have to be provided in the order described. It is however essential that the debugging unit is turned off before the keys are transferred and that the activating of a blocking or locking follows immediately after the transfer of the keys. The flash memory can be included in the device or be an external memory that is connected to the device. It can also include other data than the keys and any software associated with the keys. The working memory can of course also include other types of information. It is possible that the flash memory, in the first described embodiment can have the addresses of the defined area in the working memory stored at a specific location, which location the ROM memory then can access for finding out the destination address of the security keys. The invention is furthermore not limited to private security keys, but can be applied on any data that needs to be write-protected. In view of this the present invention is therefore only to be limited by the following claims.

The invention claimed is:

1. A method of transferring data from a non-volatile memory to a working memory of an electronic data processing device, comprising:
    copying security data from the non-volatile memory to the working memory, wherein the security data is to be write-protected;
    activating a blocking function for the security data in the working memory, wherein activating is triggered by the copying being made to the working memory;
    monitoring all communication with the working memory; and
    blocking all write attempts to the copied security data stored in the working memory according to the blocking function, wherein at least activating a blocking function, monitoring communication and blocking write attempts are performed independently of a central processing unit of the electronic data processing device, such that the central processing unit cannot manipulate the security data.

2. The method of claim 1, wherein an area of the security data in the non-volatile memory is pre-defined and pre-stored in a device for blocking write attempts and used at least in relation to activating a blocking function.

3. The method of claim 1, wherein copying data comprises copying only the security data from the non-volatile memory to the working memory independently of the central processing unit of the data processing device and copying any further data under the control of the central processing unit of the device.

4. The method of claim 3, wherein an area of the security data in the non-volatile memory and an area for storage of the security data in the working memory are pre-defined and wherein activating a blocking function is triggered by the copying being made to the pre-defined area for storage of the security data in the working memory and the blocking function is activated for that area of the working memory.

5. The method of claim 1, wherein copying comprises copying all data from the non-volatile memory to the working memory under the control of the central processing unit of the device.

6. The method of claim 5, wherein an area of the security data in the non-volatile memory is pre-defined and wherein activating a blocking function is triggered by a first detection of copying of security data from the pre-defined area in the non-volatile memory to an area of the working memory and the blocking function is activated for that area of the working memory.

7. The method of claim 1, wherein the blocking function comprises changing the destination address of the data transferred to the working memory.

8. The method of claim 1, further comprising disconnecting a debugging unit at least when copying the security data to the working memory and reconnecting the debugging unit when the blocking function has been activated.

9. A device for blocking write attempts to security data transferred from a non-volatile memory to a working memory in an electronic data processing environment that includes a central processing unit and comprising a monitoring unit configured to:
  activate a blocking function for security data in the working memory, which activation is triggered by a copying of the security data being made from the non-volatile memory to the working memory;
  monitor all communication with the working memory; and
  block all write attempts to the copied security data stored in the working memory according to the blocking function, all performed independently of the central processing unit of the electronic data processing environment such that the central processing unit cannot manipulate the security data.

10. The device of claim 9, wherein an area of the security data in the non-volatile memory is pre-defined and pre-stored in the device and used in relation at least to activating a blocking function.

11. The device of claim 9, further comprising a copy control unit configured to copy the security data from the non-volatile memory to the working memory also independently of the central processing unit of the data processing environment.

12. The device of claim 11, wherein an area of the security data in the non-volatile memory and an area for storage of the security data in the working memory are pre-defined and pre-stored in the device and the monitoring unit when activating a blocking function is triggered by the copying being made to the pre-defined area for storage of the security data in the working memory and the blocking function is activated for that area of the working memory.

13. The device of claim 9, wherein an area of the security data in the non-volatile memory is pre-defined and pre-stored in the device and the monitoring unit when activating a blocking function is triggered by a first detection of copying of security data from the pre-defined area of the security data in the non-volatile memory to an area of the working memory and the blocking function is activated for that area of the working memory.

14. The device of claim 9, wherein the blocking function of the monitoring unit comprises blocking write attempts by changing the destination address of data transferred to the working memory.

15. The device of claim 9, wherein the monitoring unit is configured to disconnect a debugging unit of the electronic data processing environment at least when the security data is copied to the working memory and to reconnect the debugging unit when the blocking has been activated.

16. The device of claim 9, wherein it is implemented in hardware.

17. An electronic data processing device comprising:
  a non-volatile memory comprising data including security data to be write-protected;
  a working memory;
  a central processing unit configured to control copying of at least some data from the non-volatile memory to the working memory; and
  a device for blocking write attempts to security data transferred from the non-volatile memory to the working memory and comprising a monitoring unit configured to:
    activate a blocking function for security data in the working memory, which activation is triggered by a copying of the security data being made from the non-volatile memory to the working memory;
    monitor all communication with the working memory; and
    block all write attempts to the copied security data stored in the working memory according to the blocking function, all performed independently of the central processing unit, such that the central processing unit cannot manipulate the security data.

18. The electronic data processing device of claim 17, wherein an area of the security data in the non-volatile memory is pre-defined and pre-stored in the device for blocking write attempts and used in relation at least to activating a blocking function.

19. The electronic data processing device of claim 17, wherein the device for blocking write attempts further comprises a copy control unit configured to copy the security data from the non-volatile memory to the working memory independently of the central processing unit and the central processing unit is configured to control the copying of further data from the non-volatile memory to the working memory.

20. The electronic data processing device of claim 19, wherein an area of the security data in the non-volatile memory and an area for storage of the security data in the working memory are pre-defined and pre-stored in the device for blocking write attempts and the monitoring unit when activating a blocking function is triggered by the copying being made to the pre-defined area in the working memory and the blocking function is activated for that area of the working memory.

21. The electronic data processing device of claim 17, wherein the central processing unit is configured to control the copying of all data from the non-volatile memory to the working memory.

22. The electronic data processing device of claim 21, wherein an area of the security data in the non-volatile memory is pre-defined and pre-stored in the device for blocking write attempts and the monitoring unit when activating a blocking function is triggered by a first detection of copying of security data from the pre-defined area of the security data in the non-volatile memory to an area of the working memory and the blocking function is activated for that area of the working memory.

23. The electronic data processing device of claim 17, wherein the blocking function of the monitoring unit comprises blocking write attempts by changing the destination address of data transferred to the working memory.

24. The electronic data processing device of claim 17, further comprising a debugging unit and wherein the monitoring unit is configured to disconnect the debugging unit at least when the security data is copied to the working memory and to reconnect the debugging unit when the blocking has been activated.

25. The electronic data processing device of claim 17, wherein the device for blocking write attempts is implemented in hardware.

26. The electronic data processing device of claim 17, wherein the device is a portable communication device.

27. The electronic data processing device of claim 26, wherein the device is a cellular phone.

* * * * *